(12) United States Patent
Anand et al.

(10) Patent No.: US 8,140,379 B2
(45) Date of Patent: Mar. 20, 2012

(54) PREDICTING SHOPPER TRAFFIC AT A RETAIL STORE

(75) Inventors: Jayaraman Anand, Singapore (SG); Kathryn Byrd Young, Cincinnati, OH (US); Ranjit Kumar Choudhary, West Chester, OH (US); Dina R. Howell, Mainville, OH (US)

(73) Assignee: Procter & Gamble, Cincinnati, OH (US)

( * ) Notice: Subject to any disclaimer, the term of this patent is extended or adjusted under 35 U.S.C. 154(b) by 0 days.

(21) Appl. No.: 13/174,806

(22) Filed: Jul. 1, 2011

(65) Prior Publication Data

US 2011/0264492 A1 Oct. 27, 2011

Related U.S. Application Data

(62) Division of application No. 11/899,150, filed on Sep. 4, 2007, now Pat. No. 7,996,256.

(60) Provisional application No. 60/847,457, filed on Sep. 27, 2006, provisional application No. 60/843,178, filed on Sep. 8, 2006.

(51) Int. Cl.
*G06F 17/00* (2006.01)

(52) U.S. Cl. ..................................... 705/7.31

(58) Field of Classification Search ................... 705/7.31
See application file for complete search history.

(56) References Cited

U.S. PATENT DOCUMENTS

| | | | |
|---|---|---|---|
| 5,128,548 A | 7/1992 | Goodson et al. |
| 5,490,060 A | 2/1996 | Malec et al. |
| 5,557,513 A | 9/1996 | Frey et al. |
| 6,098,048 A | 8/2000 | Dashefsky et al. |
| 6,837,427 B2 | 1/2005 | Overhultz et al. |
| 7,006,982 B2 | 2/2006 | Sorensen |
| 2002/0161651 A1 | 10/2002 | Godsey et al. |
| 2003/0126146 A1 | 7/2003 | Van Der Riet |
| 2005/0200476 A1 | 9/2005 | Forr et al. |
| 2005/0216339 A1 | 9/2005 | Brazell et al. |
| 2005/0234771 A1 | 10/2005 | Register et al. |
| 2005/0273377 A1 | 12/2005 | Ouimet et al. |
| 2006/0010027 A1 | 1/2006 | Redman |
| 2006/0010030 A1 | 1/2006 | Sorensen |
| 2006/0111961 A1 | 5/2006 | McQuivey |

FOREIGN PATENT DOCUMENTS

| | | |
|---|---|---|
| WO | WO9530201 A1 | 11/1995 |
| WO | WO2004027556 A2 | 4/2004 |
| WO | WO2004059369 A2 | 7/2004 |
| WO | WO2005081876 A2 | 9/2005 |
| WO | WO2005089320 A2 | 9/2005 |
| WO | WO2005089322 A2 | 9/2005 |
| WO | WO2005103979 A2 | 11/2005 |
| WO | WO2005119559 A2 | 12/2005 |

OTHER PUBLICATIONS

"In-store Advertising Audience Measurement Principles," developed by PCi and ARF, for POPAI, Jul. 2003.

Lindsay, Jeff; James Schuh, Walter Reade, Karin Peterson and Christopher McKinney, ,,The Historic Use of Computerized Tools for Marketing and Market Research: A Brief Survey; Apr. 24, 2007; http://www.jefflindsay.com/market-research.shtml, pp. 1-20.

*Primary Examiner* — Thomas Dixon

(74) *Attorney, Agent, or Firm* — David K Mattheis; Kim W Zerby

(57) ABSTRACT

Mathematical models for predicting shopper traffic at a shopper region useful for developing inter alia a metric for measuring impressions to in-store advertising.

4 Claims, No Drawings

PREDICTING SHOPPER TRAFFIC AT A RETAIL STORE

CROSS REFERENCE TO RELATED APPLICATION

This application is a divisional of U.S. patent application Ser. No. 11/899,150, filed on Sep. 4, 2007 now U.S. Pat. No. 7,996,256 and claims the benefit of U.S. Provisional Application No. 60/843,178, filed Sep. 8, 2006 and U.S. Provisional Application No. 60/847,457, filed Sep. 27, 2006.

FIELD OF THE INVENTION

A model for predicting shopper traffic is provided.

BACKGROUND OF THE INVENTION

Advertising is the process through which companies attempt to convince customers to purchase their products. Advertising takes many forms including radio advertisements, television advertisements, billboards, etc. The production and broadcasting of these advertisements has become more and more expensive. Companies wish to maximize the effect of their advertising budgets by determining the most effective means by which to deliver that message.

In order to sell advertising to companies, particular information must often be provided which illustrates the effects of the advertising. The advertising industry standard for analyzing the efficiency of an advertisement is the metric values of reach and frequency with which the advertisement is received by customers. The reach is the percentage of customers who are exposed to the advertisement and the frequency is the number of times an individual customer is exposed to the same advertisement. Companies generally wish to maximize their reach for a certain maximum frequency. This value is generally expressed in the form of a Reach/Frequency curve, or simply a "RF curve," of reach versus rating points, wherein each rating point has an associated price value.

Of course television (TV) commercials are a well known way of advertising products to the public. Currently companies such as Nielsen Media Research (NMR) provide ratings for TV programs in their entirety. Commercial prices for TV commercials are typically based on these ratings. A recent public announcement by NMR (July 2006) indicated that NMR plans to provide ratings for TV commercials themselves starting in November of 2006. Many experts predict that the new Nielsen rating for TV commercials will indicate that viewership declines when a TV program breaks for commercials given the increase use of digital video recorders and other such technologies which allow viewers to "fast forward" past the advertisements. There is a growing concern about the effectiveness of TV commercials as a venue for advertising based upon inter alia the increasing use of technologies that allow viewers to avoid viewing the advertisement and yet still view the TV program.

In-store advertising at retail stores is becoming an ever increasing effective venue for advertising. This could be a result of decreasing viewership of TV commercials or the increasing awareness of the potential effectiveness of in-store advertising at or near the point of purchase. Indeed, Recency Theory, which essentially states that the closer the advertisement exposure is to the purchasing occasion, the more effective the ad will be, is gaining wider acceptance amongst marketers. Although there have been attempts at developing such metrics to measure in-store advertising akin to the Nielsen ratings for TV commercials and for print media, to date there has not been such a metric adopted by the industry for in-store. See, e.g., "In-store Advertising Audience Measurement Principles," developed by PCi and ARF, for POPAI, July 2003; US 2006/0111961 A1; US 2006/0010027 A1; US 2006/0010030 A1; US 2005/0234771; US 2005/0216339 A1; US 2005/0200476 A1; US 2003/0126146; US 2002/0161651 A1; U.S. Pat. Nos. 5,128,548; 5,490,060; 5,557,513; 6,837,427 B2; 6,098,048; 7,006,982 B2; WO 2005/103979 A2; WO 95/30201; WO 2005/081876 A2; WO 2004/059369 A2; WO 2004/059388 A1; WO 2005/089320 A2; WO 2005/089322 A2; WO 2004/027556 A2.

Therefore, there is a need to provide such a metric to measure "viewership" of in-store advertisements that is accurate and cost effective to operate, thereby increasing the productivity and effectiveness of marketer's and retailer's spending. Moreover, the ability to calculate the cost per impression to execute in-store advertising will facilitate the allocation of media budgets between in-store versus out-of-store advertising activities, leading to improved communication approaches for the consumer and shopper.

SUMMARY OF THE INVENTION

The present invention addresses these and other needs, by providing, in a first aspect of the invention a method for developing an in-store shopper traffic prediction model, comprising the steps: (a) obtaining actual shopper traffic data at a shopper region at a retail store, wherein the first shopper region comprises at least a product category; (b) obtaining actual market data from the store (or a plurality of stores), wherein the market data comprises category purchase data from the product category; (c) inputting the shopper traffic data and the market data in an analysis program executable on a computer; and (d) executing the analysis program to develop a mathematical model capable of predicting shopper traffic at the shopper region of a target retail store.

A second aspect of the invention provides a method for predicting shopper traffic at a target store comprising the steps: (a) obtaining actual market data from the target store for a period of time, wherein the target store comprises a first shopper region, wherein the first shopper region comprises a first product category, wherein the actual market data comprises category purchase data from the first product category; (b) inputting the actual market data from the target store in an analysis program executable on a computer, wherein the analysis program comprises a mathematical model for predicting traffic; and (c) executing the analysis program to predict the shopper traffic at the first shopper region of the target store.

A third aspect of the invention provides for a method of predicting impressions at a target store comprising the steps: (a) obtaining actual market data from the target store for a period of time (e.g., 1 hour increment, or 4 hr, 24 hr, 1 week, and the like), wherein the target store comprises a first shopper region, wherein the first shopper region comprises a first product category and an in-store advertisement advertising a product (the product localized in the first shopper region or in a second shopper region) during the duration of the period of time, wherein the actual market data comprises category purchase data from the first product category; (b) inputting the actual market data from the target store in an analysis program executable on a computer, wherein the analysis program comprises a mathematical model for predicting traffic; and (c) executing the analysis program to predict impressions at the first shopper region of the target store. Preferably the mathematical model for this aspect of the invention is developed from (a) actual shopper traffic data at a first shopper region from a multiplicity of stores, wherein the first shopper region comprises at least a product category; (b) actual market data from the multiplicity of stores, wherein the market data comprises category purchase data from the product category.

A fourth aspect of the invention provides a computer program comprising an analysis program, wherein the program is executable on a computer, and comprises a mathematical model capable of predicting shopper traffic, wherein the mathematical model is developed from: (a) actual shopper traffic data at a shopper region from a multiplicity of retail stores, wherein the first shopper region comprises at least a product category; and (b) actual market data from the multiplicity of retails stores, wherein the market data comprises category purchase data from the first product category.

DETAILED DESCRIPTION OF THE INVENTION

Definitions:

"In-store" means the inside environment (opposed to the outside environment) of a retail store. The threshold of a door or opening to which a shopper enters a retail store is a line of demarcation between the inside and outside environments of a retail store.

"Retail store" or simply "store" means a store that sells a product to a shopper. Any one particular retail store can be segmented into a retail store types, including but not limited to food (e.g., KROGER), super center (e.g., WALMART), mass merchandizer (e.g., TARGET), club (COSTCO) and drug (CVS). Other examples of retail stores include ALBERTSONS, TESTCO, SAMS CLUB, WALGREENS, CARREFOUR, METRO, MAKRO, ALBERT HEIJN, and DOLLAR GENERAL. In one embodiment, the retail store is a commercial retail store (i.e., not a store dedicated for research purposes, but rather one open to the public for business). In another embodiment, the retail store is of a single store type and a single retailer (e.g., KROGER's grocery store).

"Target store" is a retail store to which the mathematical model of the present invention is directed to predict shopper traffic. The target store may or may not be a retail store from which data is obtained to develop the mathematical model of the present invention.

"Product" is broadly defined as encompassing any product, service, communication, entertainment, environment, organization, system, tool, and the like, sold in a retail store. A product may be perishable or non-perishable, consumable or durable. Many products are coded. Examples of product codes include UPC and EAN.UCC. Exemplary product forms and brands are described on The Procter & Gamble Company's website, www.pg.com, and the linked sites found thereon "Product category" or simply "category" means a multiplicity of products organized by a common theme (e.g., a product benefit). A product category will typically also have a multiplicity of product forms and brands. Product categories can be organized by category codes or sub-category codes developed by a retailer or supplier or by the industry as a whole. In one embodiment, the products of a product category may be localized in the same location in a retail store for the convenience of the shopper and to allow a shopper to do comparison shopping of the different brands within the same product category. For purposes of clarification, it should be appreciated that a product category in one store may not be located in the same physical location of a second store (e.g., laundry and fabric care be found in aisle 5 in a first store or aisle 3 in a second store—even if the store is operated by the same retailer).

For example, premium diapers in three sizes may be referred to as a "premium diaper category." Combining regular diapers of the same brand name with premium diapers may yield a broader brand-name category. Combining the brand-name diapers with diapers sold under third-party names but still made by the same manufacturer may yield a general diaper category. Combining diaper sales information with combined feminine care product sales and incontinence product sales may yield a large absorbent article category.

"Shopper" is any person that enters or exits a retail store for the purpose of considering the selection or purchase of a product. A shopper need not actually purchase a product.

"Shopper traffic" means the number of shoppers physically entering and exiting a shopper region.

"Shopper region" includes a defined area within in-store that comprises a least one product category, and whereby shoppers are capable of physically entering or exiting. Preferably the shopper region is defined such that shopper may enter and exit the shopper region, and such entry and exit is detectable. In one embodiment, the shopper region is a zone. In another embodiment, the shopper region is a single point in the store. In yet another embodiment, the shopper region comprises an adzone.

The term "adzone" means a shopper region that comprises a "stimulus." In turn, a "stimulus" is used in the broadest sense herein to include anything in-store that may impact a shopper's decision to purchase or consider purchasing a product of a product category localized in the shopper region. Examples of a stimulus include an in-store advertisement, or the change in price of a product located in the shopper region, or the packaging of a product, or the product's location in shelving in an aisle. In other examples, the stimulus may be lighting, fixture space, product placement, audio soundtrack, the assignment of a live product consultant or sales specialist, at shelf media player such as a small television with advertisement, and the like. One way to monitor whether the stimulus is being made available to shoppers at various remote locations (i.e., retail stores) for testing compliance may include those methods described by U.S. Pat. Nos. 6,837,427 B2; and 6,951,305 B2 (both references entitled "Advertising Compliance Monitoring System"), granted 4 Jan. 2005 and 4 Oct. 2005, respectively.

"In-store advertisement" means broadly all forms of in-store advertising including but not limited to audio, video, still visual, touch, taste, smell, and any combination thereof. Non-limiting examples may include signs, banners, sound, music, demonstration, combinations thereof, and the like. In an in-store advertisement localized in a shopper region, the advertisement may be located anywhere such that a shopper may have a reasonable opportunity to hear, view, or interact with the advertisement. The advertisement may or may not advertise a product localized in the adzone.

"Market data" is broadly defined as any information that is or could be used as variable in mathematically predicting shopper traffic. Market data comprises purchase data, store data, temporal data, demographic data, or combinations thereof. Some types of market data may be available from commercial sources (such as AC Nielsen or Information Resources, Inc. and the like) or from the retail store itself, e.g., U.S. Pat. No. 7,178,726 ("Method and System for Collecting Market Research Data From Consumers")

"Obtaining actual shopper traffic" is used herein the broadest sense to include any means of measuring actual shopper traffic entering or exiting a shopper region. Shopper traffic may be measured by having observers count shopper traffic by eyesight or electronically through the use of sensors. Examples of means of obtaining actual traffic may include those methods described in U.S. Pat. No. 5,138,638 (entitled in part as "System for Determining the Number of Shoppers in a Retail Store"); U.S. Pat. No. 4,356,387 (disclosing a counting system for counting persons of a minimum height using a radiant energy emitter and a radiant energy receiver); U.S. Pat. No. 4,799,243 (disclosing a person counting device by detecting the presence of thermal radiation from the body); U.S. Pat. No. 4,733,081 (directed to an apparatus for sensing a body by detecting the difference between the reflected amount of infrared rays directed to the body as against the background); U.S. Pat. No. 4,528,679 (directed to an automatic counting systems for passengers); U.S. Pat. No. 4,847,485 (discloses an arrangement for determining the number of persons within a space using infrared sensors); U.S. Pat. No. 5,138,638 (discloses a "person recognition system"); U.S. Pat. No. 5,966,696 (entitled "System for Tracking Consumer Exposure and for Exposing Consumers to Different Advertisements"); U.S. Pat. No. 6,967,674 (entitled "Method and Device for Detecting and Analyzing the Reception Behavior of People"); U.S. Pat. No. 7,006,982 B2 (entitled "Purchase Selection Behavior Analysis System and Method Utilizing a Visibility Measure"); US 2006/0010030 A1 (entitled "System and Method for Modeling Shopping Behavior"); or US 2006/0010027 A1 (entitled "Method, System and Program Product for Measuring Customer Preferences and Needs with Traffic Pattern Analysis"); U.S. Pat. No. 5,712,830 (entitled "Acoustically monitored shopper traffic surveillance . . . ").

The term "sensor" is used herein the broadest sense to include any means of counting traffic using electronics. Examples of sensors may include tracking systems such as wireless cellular, electro-magnetic, geo-positioning systems, electro-optical tracking systems such as SKU bar coding, facial recognition software, or an RFID tag and tag reader system. The sensors may be placed on the product, shopper, shopping cart, shopping basket, in-store, or combinations thereof. In one embodiment, the sensor is a "fixed sensor." The term "fixed sensor" is any equipment that can measure a shopper passing through a defined threshold in the retail store that does not require the use of the shopper to carry sensor equipment on the shopper's person. An example of a fixed sensor is an infrared emitter and sensor mounted in a store aisle.

"Purchase data" is a form of market data that is a result of shoppers who purchase a product at a retail store. Purchase data may be household-based or transaction-based. Examples of ways of obtaining purchase data may include those methods described in U.S. Pat. No. 5,490,060, entitled "Passive Data Collection System for Market Research Data," granted 9 Feb. 1996, or in International Patent Publication WO 95/30201, entitled "Method and Apparatus for Real-Time Tracking of Retail Sales of Selected Products," published 9 Nov. 1995. Purchase data may come from point-of-sale terminals, or store processors, or communications networks.

Purchase data may comprise store purchase data. "Store purchase data" is data obtained for a store or group of stores over a defined period of time. Examples of store purchase data include store items (i.e., the total number of products bought from the store), store baskets (i.e., how many baskets bought from the store), store dollars (i.e., the total sales amount in the store).

Purchase data may comprise category purchase data. "Category purchase data" means store purchase data segmented on a product category basis. Examples of category purchase data may comprise category items (i.e., number of products of a product category bought per transaction), category baskets (i.e., number of baskets the category was in), category dollars (i.e., total dollars or sales amount of the category), or category percentage of store dollars (i.e., percentage of category dollars relative to overall store dollars). For purposes of clarification, it is appreciated that the total number of category items, if tabulated, is equal to store items (but it should be appreciated that all category purchase data need not be included for purposes of developing/using the mathematical model of the present invention). Similarly, the total number of category baskets, if tabulated, is equal to store baskets, and the total number of category dollars is equal to store dollars. Other category purchase data may include those described on page 24, et seq., of US 2003/0126146 A1.

"Store data" is a form of market data that is specific to a store, that is not store purchase data, and include data such as retail store type, number of cash registers (open/operating at a particular times), and the like.

"Temporal data" is a form of market data related to time. Examples of temporal data include day of the week, time of day (e.g., four hour increment), holidays, promotions, festivals, weather, and other events that may affect traffic (e.g., purchases made in anticipation of hurricane, and the like).

"Demographic data" is a form of market data related to the age, ethnicity, gender and other demographic considerations related to the shoppers shopping at the retail store or immediately surrounding the store's geography.

Market data also comprises combinations of purchase data, store data, temporal data, and demographic data. Examples include the interaction of temporal data and category purchase data such as category items/category baskets/category dollars relative to the day of week/time of the day.

"Mathematically model" means broadly those techniques known in the art to generate a mathematical model built upon the input of variables (i.e., dependent and independent), wherein the model is capable of forecasting or predicting events, preferably within art-accepted ranges of error. Modeling may include statistical techniques such as regression (e.g., *Choosing and Using Statistics*, Calvin Dytham, Blackwell Science, 2003, page 181 et seq.); pooled regression (e.g., *Introducing Multilevel Modeling*, Ita G. G. Kreft & Jan de Leeuw, Sage Publications Ltd, 2004, page 26 et seq.); ordinary least squares (OLS) regression (e.g., *Applied Multiple Regression/Correlation Analysis for the Behavioral Sciences*, Jacob Cohen et al., Lawrence Erlbaum Associates, 2003, page 124 et seq.,); mixed modeling (e.g., *Mixed Models: Theory and Application*, Eugene Demidenko, John Wiley & Sons, Inc., 2004); multivariate regression modeling (*Bayesian Data Analysis*, Andrew Gelman & Hal S. Stem, CRC Press LLC, 2004, page 481 et seq.); and the like. Analysis programs executable on a computer to mathematically model and normalize data input into the model are also known in the art. Examples may include STATGRAPHICS from StatPoint, Inc., Herndon, Va. 20171; SAS® from SAS Institute, Inc., (*Step-By-Step Basics Statistics Using SAS*, Larry Hatcher, SAS Institute, Inc, 2003); SPSS® from SPSS Inc., (*Discovering Statistics Using SPSS*, Andy Field, SAGE Publications Ltd., 2005); MATLAB® from MathWorks, Inc. (*MATLAW Primer* (7th edition), Timothy A Davis & Kermit Sigmon, CRC Press LLC, 2005; or *Graphics and Guis with MATLAB*, Patrick Marchand & O. Thomas Holland, $3^{rd}$ edition, CRC Press LLC, 2003); and the like.

A mathematical model is typically validated by comparing forecasts or predictions with actual observed events. Such validation methods are known in the art. See, e.g., WO 2005/081876 A2, (entitled "System and Method for Analyzing and Correcting Retail Data"), published 9 Sep. 2005. Briefly, and in the context of the present invention, shopper traffic is predicted using the mathematical model of the present invention and, in turn, is compared with actually observed shopper data.

Traffic

A first aspect of the invention provides for the step of obtaining actual shopper traffic data at a shopper region at a retail store or target store, where the first shopper region has at least a product category.

In one embodiment, the floor space area of a shopper region that a shopper may enter (that does not include floor space occupied by shelving and displays and the like) may comprise from about 500 m$^2$ to about 1 m$^2$, alternatively from about 250 m$^2$ to about 2 m$^2$, alternatively from about 100 m$^2$ to about 5 m$^2$, alternatively from about 75 m$^2$ to about 25 m$^2$, alternatively from about 50 m$^2$ to about 10 m$^2$, alternatively combinations thereof.

In another embodiment, the shopper region comprises an adzone. In turn, the adzone comprises a stimulus, such as an in-store advertisement. The advertisement may advertise a product of the product category, where the in-store advertisement and product category are localized in the adzone. The product of the subject advertisement may be localized in the adzone or be localized outside of the adzone. The product of the subject advertisement may be localized in a first product category or a second product category.

In another embodiment, the adzone comprises at least two, or three, or four, or five, or six, or seven, or eight, or ten, or more product categories. In yet another embodiment, a single in-store advertisement localized in the adzone advertises multiple products in the respective two, or three, or more, product categories localized in the adzone.

In yet still another embodiment, the in-store advertising advertises two, three, four, or more products of a single product category localized in the adzone. A non-limiting example illustrating this last embodiment may include the in-store advertisement advertising the products GAIN liquid laundry detergent, GAIN powder laundry detergent, GAIN liquid fabric softener, and GAIN dryer sheet where these products are all a part of the fabric care category, wherein the in-store advertisement is localized in the same as adzone that the fabric care category is localized.

In one embodiment, the thresholds of entry/exit in an adzone are within an aisle.

The present invention also provides methods of obtaining actual shopper traffic data. In a preferred embodiment, fixed traffic sensors are used, wherein more preferably the sensors are not readily apparent to the shopper. Without wishing to be bound by theory, shopper traffic data collected by those methods that require sensors or equipment to be carried on a shopper's person, while usable, (are within the scope of the present invention but not preferred) may suffer from compliance issues (e.g., demanding that shopper remember to bring their tracking systems with them each and every time they go shopping) or bias since the shopper knows the shopper is being observed. Furthermore, such methodologies may sometimes be considered intrusive thereby again leading to compliance issues or unnecessarily sub-segmenting the sample populations to those shoppers who are willing to carry such equipment with them. Still further, asking shoppers to carry such tracking devices also increases capital and transaction costs (e.g., with passing out, retrieving, repairing these tracking devices) associated with obtaining the data. Such an approach can be cost prohibitive for those who wish to conduct such research in a timely and cost effective manner across a plurality (e.g., at least 10, or 20, 30, 40, 50, 60, 100, 200, or more) of retail stores and even a plurality of retail store types (e.g., at least 2, or 3, or 4, or more).

In a preferred embodiment, the method of obtaining actual shopper traffic is one that is non-intrusive to the shopper, i.e., it does not intrude on their privacy or impact the shopper's behavior. The method is preferably non-intrusive for store operations. The method is preferably highly accurate, with minimal false positives or missed shoppers. The method is preferably inexpensive, allowing reads across multiple retailers/categories.

In another embodiment, the residence time that any one shopper spends in the shopper region (sometimes referred to as "Buy Time" or "Dwell Time") is assessed and taken into account into developing the mathematical model herein. One advantage of taking into account residence time is that model may be able to account for those shoppers that are merely passing through the shopper region verses those shoppers that are "shopping" for products in the shopper region. Such a model may provide a more accurate measure of inter alia impressions (discussed infra). See e.g., U.S. Pat. No. 7,006,982; and US 2006/0010030 A1.

In another embodiment, whether a shopper actually gives attention to or faces the stimulus (e.g., in-store advertisement) is assessed and taken into account into developing the mathematical model. In this embodiment, the "impressions" data may be transformed into an even more accurate data since the model takes into account those who actually "see" the stimulus (opposed to those who simply had an opportunity to see the stimulus). For example, a proximity sensing means may be used that comprises any one of several commercially available motion sensors, heat sensors, vision sensors, or other sensors that are capable of detecting persons, or appropriate combinations thereof. Such motion sensors may include ultra-sound sensors or complex motion sensors operating with an object recognition algorithm. A plurality of ultra-sound sensors may be used for improving the accuracy and detection range of the system. Complex sensors, such as optical sensors or cameras, or combinations thereof, can be used for determining the shape of a viewer within the proximity range and for determining if a viewer is facing the stimulus (e.g., in-store advertisement), to determine if the viewer is actually viewing information being shown by the stimulus. Suitable heat sensors include commercially available heat sensors and infrared detectors. See e.g., U.S. Pat. No. 5,966,696 (entitled "System for Tracking Consumer Exposure and for Exposing Consumers to Different Advertisements").

In another embodiment, the fixed traffic sensor is localized at the shopper region without the need of placing sensor equipment on the shopper's person or on the shopping carts, baskets, and the like. Without wishing to be bound by theory, sensors placed on shopping carts/baskets may lead to inaccurate data because such a techniques may exclude those shoppers obtaining a few products that the shopper carries on the shopper's person (without a cart or basket) to the checkout. Sensors on carts/baskets also may erroneously include children who often push the carts (perhaps straying away from a parent) who are frequently not ultimate decision makers on which products get purchased at the store (and thus are not a "shopper" as the term is used herein).

In another embodiment, a fixed camera is located in an area to observe shoppers entering or exiting a shopper region, and human or electronic analysis counts shoppers who fit the required operational definition of traffic.

In another embodiment, a human observer counts the number of shoppers inside a shopper region at a specific point in time, and inputs this count along with the total number of shoppers entering and existing the store during a time period (as measured at the store entrance/exits via a continuous counter), into a model, which projects the traffic associated with the shopper region.

In another embodiment, sensors exclude children by having sensors that distinguish by height or some other feature. In yet another embodiment, fixed sensors are placed from about 100 cm to about 150 cm, alternatively from about 110 cm to about 140 cm, alternatively from about 120 cm to about 130 cm, alternatively from about 114 cm to about 127 cm, alternatively combinations thereof, perpendicularly from the floor of the retail store. If the sensor comprises a beam (such as an IR beam), the beam is passed between the beam emitter and beam receiver parallel or substantially parallel to the floor to exclude children from being taken into account in obtaining actual shopper traffic. Without wishing to be bound by theory, having the beam adjusted at the described height will mostly likely capture "shoppers" as opposed to children. In yet another embodiment, a defined shopper region has a least two sensors (for measuring two different thresholds) for detecting shoppers entering and exiting through the shopper region.

Other ways of counting shoppers may include those described in US 2006/0010030 A1; and U.S. Pat. No. 7,006, 982 B2.

Impressions

In another aspect of the invention, the mathematical model of the present invention is used to predict the number of impressions to an advertisement localized in an adzone. The term "impressions" means shopper traffic with an opportunity to view, hear, interact, or be exposed to the stimulus localized in the adzone. The shopper need not actually see, hear, or interact with the stimulus but must be within close enough physical proximity for the opportunity to see, hear, or interact with the stimulus. Once impressions are predicted, such impressions can be easily translated to gross impressions (e.g., sum of all impressions for an advertising campaign) and a Gross Rating Point or "GRP" (gross impressions equal to one percent of the intended population or the sum of the rating point for the advertising campaign). In-store GRP is generally discussed in "In-Store Advertising Audience Measurement Principles," developed by PCi and ARF for POPAI, July 2003 (hereinafter "POPAI article" and included in the Information Disclosure Statement herein). However, unlike the methodology of POPAI, the mathematical model of the present invention is built upon actual shopper traffic and market data at the category level providing a more accurate prediction of impressions associated with the shopper region (verses only at the store level).

Systems

Yet another aspect of the invention provides for methods, systems and computer program products.

One embodiment of the present invention provides for a system of obtaining actual shopper traffic without interfering in any way with the store traffic, and more preferably without requiring any involvement of store personnel. In a preferred embodiment, the system operates fully automatically without the shoppers even knowing of its existence. The information from a traffic sensor is communicated to a central processing unit (CPU) which interprets the data from the sensor. The data, in turn, may be transmitted to the store controller or in-store processor (ISP) or to a remote location outside the store (e.g., a host computer).

In another embodiment, market data available from the store's point of sale (POS) system and other store computer systems may be communicated to the CPU, ISP, or to a remote location outside the store. Traffic data may or may not be integrated with the market data at any one or more of these transmission points (i.e., by the CPU, ISP, or remote system).

Non-limiting examples of market data potentially available from the POS or other store computer systems may include: sales (customers), dollar sales, times of sales, locations of sales, sales categories, labor hours, and the like.

Data systems for transferring shopper traffic data, and market data, or other relevant data via the Internet/Intranet may be described in US 2003/0126146 A1 (entitled "Marketing Communication and Transaction/Distribution Services Platform for Building and Managing Personalized Customer Relationships") and U.S. Pat. No. 5,966,696 (entitled, "System for Tracking Consumer Exposure and for Exposing Consumers to Different Advertisements.")

The systems of the present invention also includes at least one computer-readable medium used for storing computer instructions, data, mathematical models of the present invention, output from said models, program product, and the like. A general example of a computer is described in US 2006/0010027 A1, paragraph 78. Examples of computer readable media are compact discs, hard disks, floppy disks, tape, magneto-optical disks, PROMs (EPROM, EEPROM, Flash EPROM, etc.), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools. Such computer readable media further includes the analysis program of the present invention, in accordance with description of the various aspects/embodiments of the present invention herein.

The computer code devices of the present invention can be any interpreted or executable code mechanism, including but not limited to scripts, interpreters, dynamic link libraries, Java classes, and complete executable programs which when executed, perform the methods of the invention. The method can be implemented as a software program using a variety of programming languages, such as Simula, C++, Visual Basic or Java, by programming techniques known to those of skill in the art. Thus, the present invention may be implemented on a machine, such as the general purpose computer, that transforms data (e.g., traffic data/market data to build models; or predicting traffic in view market data input into models) to achieve a practical application. In conjunction with the data processing system, the undertaking as described here is implemented by successively adding increasingly detailed traffic data/market data to a database which may be retained on computer-readable media of the system. The data is processed by one or more programs executed by the CPU which are designed to analyze the proffered data against various mathematical models of the present invention and previously stored data related to traffic/market data. Accordingly, the process interrelates the programs and data to present customized solutions.

The system further includes communication means such as a modem or other known data transmission means for connecting one or more systems comprising the present invention to at least a computer, preferably to a host computer. A plurality of systems comprising the present invention can be coupled to the host computer via known data transmission lines and using known methods such as the Internet and Intranet. The communication means may also be utilized to enable the system to receive data computes or other data source coupled to the communication means. Of course, data transmission is not confined to hard lines as the use of wireless communication between the systems and computers is also contemplated by the invention.

Applications of Predicting Traffic

Predicting shopper traffic in accordance to the present invention may be used for a number of purposes (beyond developing in-store GRP). For example, shopper traffic may be correlated to actual product sales to identify the success or failure of different product inducement strategies. Traffic data may indicate problems with particular areas of a store or to correlate traffic with proposed sales variables, factors thought to influence buying decisions, such as product placement in the store, weather, economic data, and the like. A method of designing advertising is described in US 2005/0216339 A1, entitled "Systems and Methods for Optimizing Advertising," published 29 Sep. 2005; US 2007/0156887, entitled "Predicting Ad Quality.".

The results of the modeling can then be used to remediate sales impediments, e.g., aisle conditions, or implement product inducements to improve product sales, for example by adjusting product placement on the shelves of an aisle, offering product discounts at a given store location, etc. Alternatively the results may suggest impediments to sales or show relatively underutilized areas of the store and to test that area after an impediment is removed.

The systems and methods of the present invention may also be used to allocate store assets such as employees and physical resources. For example, the identification tags may be read and correlated to detect when a critical mass of customers will predicatively aggregate in an area of a store, then directing employees to that area, or by then making physical resources more available to that area of the store to accommodate the increased number of customers. The traffic models of the present invention may also be used to predict when a location within the store may need additional store resources or employees. In the program product and software implementation of the present invention, the critical mass number is predetermined according to the preferences of the user. The location of the store assets may be monitored as well by placing tracking devices on those assets.

For example, traffic data may be integrated with known or discovered (through other means) effectiveness of in-store advertising to derive an estimate of incremental sales when the advertising is placed in different shopper regions within a single store or in different stores' shopper regions.

In an additional example, impressions associated with in-store advertising event(s) may be combined with knowledge of the impressions associated with out-of-store advertising event(s) to mathematically model the source of overall brand sales lift.

In one embodiment, an in-store marketing metric is calculated from: multiplying predicted in-store traffic with the compliance associated with advertising the advertisement; multiplying again by unduplicated impressions. The metric can also be used to generally forecast traffic and unduplicated impressions with a high degree of accuracy. The metric can be used by retailer, with data from a limited sampling of stores, to project traffic, impressions, etc., chain wide with a high degree of accuracy.

Other applications of the present invention may include coupling the present invention with the shopper or consumer testing technologies disclosed in US 2002/0161651 A1; US 2003/0149344; US 2007/0156515 A1; U.S. Pat. No. 7,246,083.

EXAMPLE

A non-limiting example for developing an in-store shopper traffic predication model is described.
Selection of Retail Stores:

Retail stores in N and NE Atlanta, Ga. are chosen to include WAL-MART, KROGER, and WALGREENS. ALBERTSONS in Portland, Oreg. is also chosen. The criteria for store selection include a common size or floor plan typical of the retail store. Of note, the retail stores may differ in size or floor plan but the retail store is chosen such that no single size or plan dominates any retailer. The retail store selection is made such that no other traffic or research is in progress at the retail store during actual traffic measurement. The retail stores are selected such that the store is located in near median demographics (i.e., not at a top or bottom level of affluence). Lastly, the retail stores are inspected to ensure the store does not have any physical impediments to participation (e.g., construction, atypical fixturing, and the like).
Measuring Actual Traffic:

Actual traffic is measured using a wireless bidirectional infrared sensor, where the sensor comprises an infrared transmitter and a receiver. When the infrared beams are broken by a passing shopper in the shopper region, the sensor takes a raw count, also noting the direction of the shopper. The sensor operates on batteries and requires no wires. The dimension of the transmitter or receiver is about 4.5 inches×2.5 inches×1.5 inches. The sensor is installed at 4-5 feet above the floor, connected to a shelf or permanent fixture with removable ties or glue or the like. Care is taken to ensure that the two parts of the sensors are facing one another so the transmitter beams match the receiver. The sensors are installed such that their placement will not interfere with layout of products on store shelf or the general shop-ability of shelving fixtures. The emitted beam is sufficiently of such a low energy level that even if shoppers look directly at the beam, it is not visible and no vision issues could result. The sensors are checked weekly to ensure they have not been accidentally blocked or moved out of alignment. This will involve a visual check of each sensor.

For reporting, raw counter data is transmitted wirelessly to a central station inside the store, which can be stored out of sight on top of a gondola or the like. The central station requires electricity. Results are cumulated and sent by the central station directly to a remote location such as a home office or headquarters, which cumulates the results.
Defining Shopper Regions:

As previously described, shopper regions comprise at least one product category. Product categories may include: Bandages First Aid, Disposable Toilet Brushes, Bottled Water, Carbonated Beverages, Action Figures, DVD (Racetrack), Breakfast Bars/Pastries, Breakfast Cereal, Cookies, Crackers, Beer, Body Lotion, Body Wash, Cat Food, Cleaners, Coffee, Cosmetics, Cough/Cold, Deodorant, Dish Soap, Dog Food, Dog Treats, Fabric Conditioner Sheets, Facial Tissue, Hair Coloring, Hair Spray, Laundry Detergent, Mops, Multi Purpose Cleaners, Napkins, Oral Care/Supplies, Paper Towels, Pet Supplies/Grooming, Salted Snacks, Shampoo Conditioner, Shaving Razors, and Bath/Hand Soap. Traffic is measured at the shopper regions in several retail stores within several retail store types, with the objective of allowing for a robust cross-format assessment of traffic for the product categories that define the shopper region. Of course the number of product categories, retail stores, and retail store types may be increased for even a more robust model.

It is recognized that a single set of sensors installed in a store may be simultaneously associated with two or more product categories. For example, a shopper region that is associated with Laundry Detergent may also be associated with Bleach or Cleaners. These "opportunistic" categories are mapped as duplicates and are included as counts.

Sensor Placement:

In the interests of minimizing costs, each sensor is re-used to measure traffic at different shopper regions in the store in two week cycles. The first week of the two-week cycle is allocated for moving/installing the sensor. The second week of the two-week cycle is used to measure actual traffic. For example, after the first cycle is concluded at a first shopper region, the first week of the second cycle is dedicated to moving/installing the sensor to a second shopper region. The second week of the second cycle is used to measure actual traffic at the second shopper region. The process is then repeated for third or fourth or more shopper regions.

To measure the validity and reliability of the sensors, a third party auditor is used to count traffic in a single Wal-Mart Supercenter on a busy holiday Saturday (Saturday before Easter) in the same two locations that had bi-directional sensors. The data is paired by the third party auditor for an objective comparison. Based on this comparison, traffic data is adjusted by an average of 8% to 9% per hour to reflect an over-estimation when raw counts per hour are at or below 375 per hour. When raw counts per hour are above 375, traffic data is adjusted by an average of about 28% per hour to reflect an under-estimation of traffic.

Matching Physical Traffic with Product Sales for Model Development:

Individual sensor counts on shopper region basis are reported. This traffic data is reported as a CUBE file. Traffic data from the CUBE file, for a defined period of time, is matched to purchase data and is placed in an EXCEL file.

Using a combination of UPC matching and retail store-specified category definitions, products localized in the shopper region are matched with store purchase data, across all relevant time periods (e.g., hourly to daily). Purchase data, including store purchase data, is provided by retail store information systems or market research personnel.

A unified EXCEL file containing purchase data and traffic information is uploaded into JUMP (a front-face for SAS) that allows for mathematical modeling approaches. Using JUMP, linear correlations between the purchase data and measured traffic is created. It is observed that store baskets have somewhat higher correlation than store items or store dollars, so store baskets are used in data cleaning/understanding exercises. It is observed that the slope of the single-variable linear regression (using store baskets verses traffic) is different for different product categories within a store and different across different retail store types within the set for the same category. Therefore there is a suggestion that the mathematical model would have to include "category purchase data" and "retail store" as variables. It is observed that there is a very low $R^2$ value between traffic and baskets (i.e., very little variation in traffic is explained by the baskets variable) for product categories where the average four-hour number of baskets containing the product category is less than 2.0 (e.g., on average across four-hour periods, fewer than two people purchased a product in the product category).

Model Development:

Regression analysis is a statistically-based data processing technique which is used to evaluate multi-variable environments and which assigns a coefficient to each variable which represents its relative impact to the dependent variable (in our example traffic), i.e., how much of a measured change is attributable to each variable. In one approach of regression modeling, two types of variables are typically present: fixed and random. Random variables change with time (generally such as store purchase data) while fixed variables stay the same over the time period (generally such as product category and store). The SAS program is used to build the mathematical model by entering fixed and random variables that includes inter alia store purchase data, store data, temporal data, demographic data, or combinations thereof. Any regression analyses approaches, such as, pooled regression, or mixed models (fixed and random effects), or combinations thereof, may be used here to estimate the coefficients. The relationship between the dependent and independent variables is defined according to: $y_{ii}=\Sigma_k X_{iik}\beta_k+e_{ii}$, wherein "y" is the dependent variable measured at different times ("i") and category combinations ("i"), and "X" s are the independent variables, and "e" is the error term. "$\beta_k$" is estimated by the regression model. Error term "$e_{ii}$", is independently and identically distributed ("iid") and with mean of $e_{ii}$ $E(e_{ii})=0$ and the best linear unbiased estimator (BLUE) of the $\beta_k$ is the least squares estimate (OLS). With respect to mixed models, a variable is entered in the equation as a "fixed effect" if the values that occur in the data are all values about which an inference is to be made (e.g., store type, channel and other hierarchy market data, region, geo-demographic characteristic, etc.). A variable is entered in the equation as a random effect if it is considered a random selection from a larger population (e.g., store, category etc.). Thus the present representation of regression model equation is represented by: $y_{ii}=\Sigma_k X_{iik}\beta_k+Uj+e_{ii}$; $E(u_s)=0$, Here $u_{ii\ s}$ are iid; wherein y's represent traffic (the dependent variable), X's represent the fixed affect independent variables (e.g., category and store related variables, etc.), and U's represent random effect independent variables (e.g., day of week, time of day, etc.). These coefficients $\beta_k$ are estimated using commercially available statistical packages (e.g., SAS, SPSSS, MATLAB, and the like). The actual and predicted chart for the different product categories is calculated over a 4-hour period and 24 hour periods. The models are run at the 4-hour and daily (24 hours). The model results are robust with a $R^2$ of 0.76 for four hours and an $R^2$ of and 0.69 for 24 hours.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

All parts, ratios, and percentages herein, in the Specification, Examples, and Claims, are by weight and all numerical limits are used with the normal degree of accuracy afforded by the art, unless otherwise specified.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the DETAILED DESCRIPTION OF THE INVENTION are, in the relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of predicting impressions at a target store comprising the steps:
   (a) obtaining actual market data from the target store for a period of time,
   wherein the target store comprises a first shopper region,
   wherein the first shopper region comprises a first product category and an in-store advertisement advertising a product during the duration of the period of time,
   wherein the actual market data comprises category purchase data from the first product category;
   (b) inputting the actual market data from the target store in an analysis program executable on a computer,
   wherein the analysis program comprises a mathematical model for predicting traffic;
   wherein the mathematical model is developed from:
      (i) actual shopper traffic data at a first shopper region from at least ten retail stores, wherein the first shopper region comprises at least a first product category;
      (ii) actual market data from said ten retail stores, wherein the market data comprises category purchase data from the first product category; and
   (c) executing the analysis program to predict impressions at the first shopper region of the target store.

2. The method of claim 1, further comprising the step of normalizing the mathematical model for: (i) the period time from which the actual market data from the target store is obtained and; (ii) the first product category.

3. The method of claim 2, wherein the market data from the target store further comprises at least two of the following: store purchase data, store data, temporal data, demographic data, or combinations thereof.

4. The method of claim 3, wherein market data from the target store further comprises the following: store purchase data, store data, temporal data, and demographic data; and
   wherein the first category purchase data further comprises: category items, category baskets, category dollars, and category percentage of store dollars; and
   wherein the product which the in-store advertisement advertising is localized in the first shopper region or a second shopper region.

* * * * *